United States Patent
D'Penha et al.

(10) Patent No.: US 8,788,571 B2
(45) Date of Patent: Jul. 22, 2014

(54) APPARATUS AND METHOD THAT PROVIDE DATA COMMUNICATION

(75) Inventors: Lindsay D'Penha, Pacific Grove, CA (US); Thomas Sterns, Pacific Grove, CA (US); Jordy G. Boom, Marina, CA (US)

(73) Assignee: Language Line Services, Inc., Monterey, CA (US)

(*) Notice: Subject to any disclaimer, the term of this patent is extended or adjusted under 35 U.S.C. 154(b) by 812 days.

(21) Appl. No.: 12/611,506

(22) Filed: Nov. 3, 2009

(65) Prior Publication Data

US 2011/0106873 A1 May 5, 2011

(51) Int. Cl.
*G06F 15/16* (2006.01)
*H04L 29/06* (2006.01)
*H04M 7/00* (2006.01)

(52) U.S. Cl.
CPC ........... *H04L 65/104* (2013.01); *H04M 7/0024* (2013.01); *H04L 65/1063* (2013.01)
USPC ....................................... 709/202; 379/90.01

(58) Field of Classification Search
USPC ....................................... 709/202; 379/90.01
See application file for complete search history.

(56) References Cited

U.S. PATENT DOCUMENTS

| | | | |
|---|---|---|---|
| 2006/0050688 A1* | 3/2006 | Panagopoulos et al. | 370/356 |
| 2006/0210040 A1* | 9/2006 | Citron et al. | 379/189 |
| 2007/0239625 A1* | 10/2007 | Sterns et al. | 705/400 |
| 2008/0240388 A1* | 10/2008 | Surette | 379/114.2 |
| 2009/0119190 A1* | 5/2009 | Realini | 705/30 |
| 2009/0125295 A1* | 5/2009 | Drewes | 704/3 |

* cited by examiner

*Primary Examiner* — Thomas Dailey
(74) *Attorney, Agent, or Firm* — Patent Ingenuity, P.C.; Samuel K. Simpson

(57) ABSTRACT

An Internet enabled communication device has a data module that sends user data through the Internet to a web services system, requests an acknowledgement from the web services system based on the user data to proceed with a voice communication, and receives the acknowledgement from the web services system if the web services system receives the user data and the user is authorized to proceed with the voice communication. The Internet enabled communication device also has a telephony module that, subsequent to the data module receiving the acknowledgement from the web services system, initiates the voice communication through a telephone network to an automated system. The automated system accesses the user data in the database to automatically connect the user to a service without the user having to input the user data through the automated system.

58 Claims, 10 Drawing Sheets

APPARATUS AND METHOD THAT PROVIDE DATA COMMUNICATION

BACKGROUND

1. Field

This disclosure generally relates to the field of data communication. More particularly, the disclosure relates to connecting a device for data communication.

2. General Background

As the utilization of electronic devices for communication has increased, the demand for applications on these devices has also increased. For example, many cell phones now have many different types of applications from which a user can select. The applications may include music, video, telephony, and a variety of other different types of applications.

However, some cell phone manufacturers have imposed a limitation on their cell phones that allows only one application to run in the memory space of the cell phone at a given time. In particular, the telephony application may be restricted to being run alone as unauthorized access to the cell phone may occur more easily through the telephony application than other applications.

Although the security of the cell phone may be strengthened by the limitation of allowing only one application to run in the memory space of the cell phone at a given time, the versatility of the cell phone is at the same time diminished. Currently, users would like both security and versatility accomplished simultaneously.

SUMMARY

In one aspect of the disclosure, an Internet enabled communication device is provided. The Internet enabled communication device has a data module that sends user data through the Internet to a web services system, requests an acknowledgement from the web services system based on the user data to proceed with a voice communication, and receives the acknowledgement from the web services system if the web services system receives the data and the user is authorized to proceed with the voice communication. The user data includes an identifier. The web services system stores the data in a database according to the identifier. Further, the Internet enabled communication device has a telephony module that, subsequent to the data module receiving the acknowledgement from the web services system, initiates the voice communication through a telephone network to an automated system that obtains the identifier to access the user data in the database to automatically connect the user to a service without the user having to input the user data through the automated system.

In another aspect of the disclosure, a system is provided. The system has a database. Further, the system has a web services device that (i) receives, from a data module in an Internet enabled communication device, through the Internet user data and a request of an acknowledgement based on the user data to enable the Internet enabled communication device to proceed with a voice communication and (ii) sends the acknowledgement to the data module in the Internet enable device if the web service platform receives the user data and determines that the user is authorized to proceed with the voice communication. The user data includes an identifier. The web services system stores the data in the database according to the identifier. In addition, the system has an automated system that, subsequent to the web services system sending the acknowledgement to the data module, (i) receives a request from a telephony module in the Internet enabled communication device to initiate the voice communication through a telephone network and (ii) obtains the identifier to access the user data in the database to automatically connect the user to a service without having to receive the user data directly from the user.

In yet another aspect of the disclosure, a process is provided. The process sends, with a data module executed by a processor in an Internet enabled communication device, user data through the Internet to a web services system, the user data including an identifier, the web services system storing the data in a database according to the identifier. Further, the process requests, with the data module executed by the processor in the Internet enabled communication device, an acknowledgement from the web services system based on the user data to proceed with a voice communication. In addition, the process receives, with the data module executed by the processor in the Internet enabled communication device, the acknowledgement from the web services system if the web services system receives the data and the user is authorized to proceed with the voice communication. The process also initiates, with a telephony module executed by the processor in the Internet enabled communication device, the voice communication through a telephone network to an automated system that obtains the identifier to access the user data in the database to automatically connect the user to a service without the user having to input the user data through the automated system subsequent to the acknowledgement being received by the data module.

In another aspect of the disclosure, a process is provided. The process receives, at a web services system from a data module in an Internet enabled communication device through the Internet, user data and a request of an acknowledgement based on the user data to enable the Internet enabled communication device to proceed with a voice communication. The user data includes an identifier. The web services system stores the data in a database according to the identifier. Further, the process sends, from the web services system to the data module in the Internet enabled communication device through the Internet, the acknowledgement to the data module in the Internet enabled communication device if the web service platform receives the user data and determines that the user is authorized to proceed with the voice communication. In addition, the process receives, at the automated system subsequent to the acknowledgement being received by the data module from the web services system, a request from a telephony module in the Internet enabled communication device to initiate the voice communication through a telephone network. The process also obtains, with the automated system subsequent to the receipt of the request from the telephony module, the identifier to access the user data in the database to automatically connect the user to a service without having to receive the user data directly from the user.

In yet another aspect of the disclosure, a computer program product is provided. The computer program product includes a computer useable medium having a computer readable program. The computer readable program when executed on a computer causes the computer to send, with a data module executed by a processor in an Internet enabled communication device, user data through the Internet to a web services system. The user data includes an identifier. The web services system stores the data in a database according to the identifier. Further, the computer is caused to request, with the data module executed by the processor in the Internet enabled communication device, an acknowledgement from the web services system based on the user data to proceed with a voice communication. In addition, the computer is caused to receive, with the data module executed by the processor in the Internet enabled communication device, the acknowledgement from the web services system if the web services system receives the data and the user is authorized to proceed with the voice communication. The computer is also caused to initiate, with a telephony module executed by the processor in the Internet enabled communication device, the voice communication through a telephone network to an automated system that obtains the identifier to access the user data in the database to automatically connect the user to a service without the user having to input the user data through the automated system subsequent to the acknowledgement being received by the data module.

In another aspect of the disclosure, a computer program product is provided. The computer program product includes a computer useable medium having a computer readable program. The computer readable program when executed on a computer causes the computer to receive, with a web services system from a data module in an Internet enabled communication device through the Internet, user data and a request of an acknowledgement based on the user data to enable the Internet enabled communication device to proceed with a voice communication. The user data includes an identifier. The web services system stores the data in a database according to the identifier. Further, the computer is caused to send, with the web services system from the data module in the Internet enabled communication device through the Internet, the acknowledgement to the data module in the Internet enabled communication device if the web service platform receives the user data and determines that the user is authorized to proceed with the voice communication. In addition, the computer is caused to receive, with the automated system subsequent to the acknowledgement being received by the data module from the web services system, a request from a telephony module in the Internet enabled communication device to initiate the voice communication through a telephone network. The computer is also caused to obtain, with the automated system subsequent to the receipt of the request from the telephony module, the identifier to access the user data in the database to automatically connect the user to a service without having to receive the user data directly from the user.

In yet another aspect of the disclosure, a system is provided. The system includes a computing device that sends user data through a first network to a services system, requests an acknowledgement from the services system based on the user data to proceed with a voice communication, and receives the acknowledgement from the services system if the services system receives the data and the user is authorized to proceed with the voice communication. The user data includes an identifier. The services system stores the data in a database according to the identifier. Further, the system includes a telephone, subsequent to the computing device receiving the acknowledgement from the services system, that initiates the voice communication through a second network to an automated system that obtains the identifier to access the user data in the database to automatically connect the user to a service without the user having to input the user data through the automated system, the second network being distinct from the first network.

In another aspect of the disclosure, a system is provided. The system includes a database. Further, the system has a services device that (i) receives, from a computing device, through a first network user data and a request of an acknowledgement based on the user data to enable the computing device to proceed with a voice communication and (ii) sends the acknowledgement to the computing device if the services device receives the user data and determines that the user is authorized to proceed with the voice communication. The user data includes an identifier. The services device stores the data in the database according to the identifier. In addition, the system has an automated system that, subsequent to the services device sending the acknowledgement to the computing device, (i) receives a request from a telephone to initiate the voice communication through a second network and (ii) obtains the identifier to access the user data in the database to automatically connect the user to a service without having to receive the user data directly from the user. The second network is distinct from the first network.

In yet another aspect of the disclosure, a system is provided. The system includes a computing device that sends user data through a first network to a services system, requests an acknowledgement from the services system based on the user data to proceed with a communication, and receives the acknowledgement from the services system if the services system receives the data and the user is authorized to proceed with the communication. The user data includes an identifier. The services system stores the data in a database according to the identifier. Further, the system includes a communications device that, subsequent to the computing device receiving the acknowledgement from the services system, initiates the communication through a second network to an automated system that obtains the identifier to access the user data in the database to automatically connect the user to a service without the user having to input the user data through the automated system.

In another aspect of the disclosure, a system is provided. The system includes a database. Further, the system includes a services device that (i) receives, from a computing device, through a first network user data and a request of an acknowledgement based on the user data to enable the computing device to proceed with a communication and (ii) sends the acknowledgement to the computing device if the services device receives the user data and determines that the user is authorized to proceed with the communication. The user data includes an identifier. The services device stores the data in the database according to the identifier. In addition, the system includes an automated system that, subsequent to the services device sending the acknowledgement to the computing device, (i) receives a request from a telephone to initiate the communication through a second network and (ii) obtains the identifier to access the user data in the database to automatically connect the user to a service without having to receive the user data directly from the user, the second network being distinct from the first network.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 2A illustrates an external view of the Internet enabled communication device when the user is creating an account.

FIG. 2B illustrates an external view of the Internet enabled communication device when the user is attempting to connect to an interpreter.

FIG. 2C illustrates a variety of different categories of phrases from which the user may make a selection.

FIG. 2D illustrates various phrases after a user makes a selection of a phrase category.

FIG. 2E illustrates a phrase that has been selected and the corresponding translation of that phrase.

DETAILED DESCRIPTION

A method and apparatus is provided for enabling an Internet enabled communication device to initiate a service. An example of a service is a connection to a language interpreter to obtain language interpretation. A seamless approach is provided so that a user may easily connect to the service irrespective of limitations imposed by the Internet enabled device.

Figure 1:
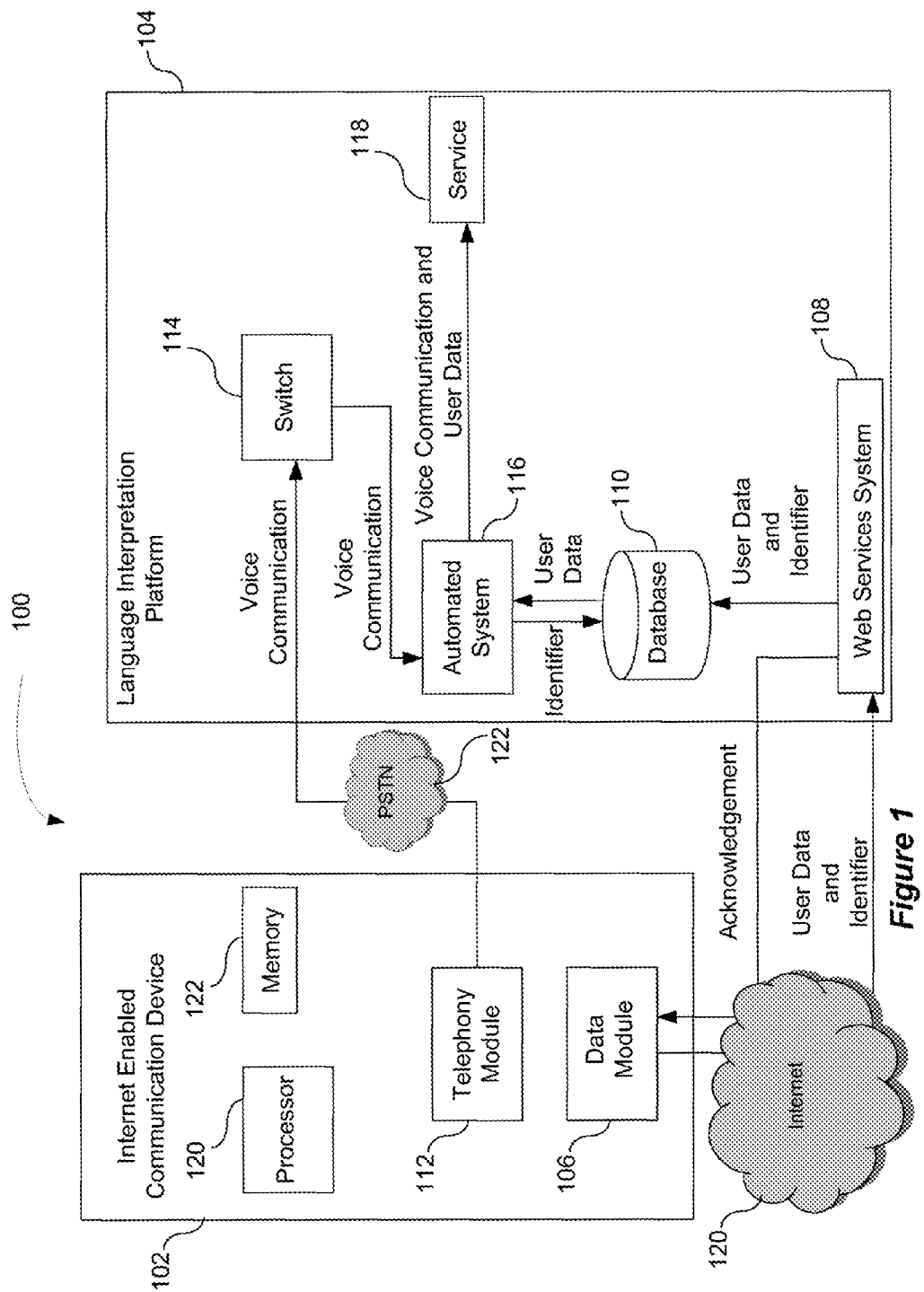
FIG. 1 illustrates a language interpretation system.

FIG. 1 illustrates a language interpretation system 100. A user may have an Internet enabled communication device 102 that the user utilizes to connect to a service 118, which may be a language interpretation service provided by a language interpretation platform 104. The Internet enabled communication device 102 may be any communication device that has connectivity to the Internet. For illustrative purposes, the Internet enabled communication device is shown with a telephone capability, e.g., a cell phone, smart phone, personal digital assistant, etc., but the Internet enabled communication device may be a general computer, mp3 player, video player, etc. In other words, the Internet enabled communication device is not limited to a device having a telephone capability. Further, the service 118 is illustrated as a language interpretation service for illustrative purposes, but the service 118 may be selected from a variety of services other than a language interpretation service.

The Internet enabled communication device 102 has a processor 120 and a memory 122. The processor 120 executes instructions for a module stored in memory for a period of time. Further, the Internet enabled communication device 102 has a telephony module 112 and a data module 106. In one embodiment, the Internet enabled communication device 102 imposes a restriction such that the memory 122 can only store one module at a time. Accordingly, the Internet enabled communication device 102 would not be able to store both the telephony module 112 and the data module 106 in the memory 122 at the same time for execution. If the user has entered in user data for a language interpretation account such as user name, account information, a language for language interpretation, etc., that information cannot be kept in memory once the telephony module is placed in memory to make a telephone call. In addition, the only data that can typically be transmitted to an automated telephone system is data in Dual Tone Multi-Frequency ("DTMF"), which is a system utilized for touch tone telephones. A frequency, i.e., the dual tones, is configured for each button so that a processor can recognize the button that is pressed. The restriction of having one module in memory at a time prevents the transfer of the user data in DTMF to the telephony module after the call has been initiated. As a result, the user may have to enter all of that information in when the telephone call is placed to an automated system 116.

In one embodiment, the data module 106 receives the user data from the user. The data module 106 then provides the user data along with an identifier through the Internet 120 to a web services system 108. The web services system 108 may be a computer that is utilized by the language interpretation platform 104. An example of the identifier is the telephone number corresponding to the Internet enabled communication device. However, other types of identifiers may be utilized. The web services system 108 stores the user data and the identifier in a database 110. The web services system 108 determines if the user is authorized to proceed with the telephone call. For example, the web services system may contact a credit card processor to determine if the credit card provided by the user is valid and if a predetermined minimum amount of available credit is available on the credit card of the of the user. If the user is authorized to proceed with the telephone call, the web services system 108 provides an acknowledgement to the data module 106 that the web services system 108 received the user data with the identifier and that the user is authorized to proceed with the telephone call. In one embodiment, the data module 106 requests the acknowledgement. In an alternative embodiment, the web services system 108 provides the acknowledgement without the data module 106 providing a request to the web services system 108.

Subsequent to the data module 106 receiving the acknowledgement from the web services system 108, the telephony module 112 initiates the telephone call through a telephone network such as a public switched telephone network ("PSTN") 122. For example, the telephone call is received at a switch 114 at the language interpretation platform 104 that can be connected to the PSTN 122. However, other phone networks such as digital phone networks may be utilized. The switch 114 provides the telephone call to the automated system 116. Further, the automated system 116 obtains the identifier. For example, the automated system 116 may utilize caller id to obtain the telephone number of the Internet enabled communication device 102. For instance, the automatic number identification ("ANI") service may be utilized to determine the telephone number of an incoming call. The automated system 116 then utilizes the identifier to retrieve the user data from the database 110. The user data had been previously stored by the web services system 108 in the database 110. Accordingly, the automated system may then utilize the user data to automatically connect the user to a service without the user having to input the user data through the automated system 116. As a result, the user may not even realize that he or she has been connected to the automated system 116. For example, the user may enter his or her user data into the Internet enabled communication device 102 prior to the telephone call and then after the telephone call is initiated, the automated system 116 may automatically connect the user with a language interpreter without the user having to directly provide the user data through the automated system 116. The user may not even realize that he or she has been first connected to the automated system 116 before being connected to the language interpreter. The automated system 116 selects an interpreter with the qualifications to provide language interpretation to the user based on the user data. For example, if the user needs an interpreter for Spanish, the automated system 116 selects an interpreter that is qualified to interpreter Spanish. Accordingly, the Internet enabled communication device 102 has the ability to transmit control and attribute data to the automated system 116 without utilizing DTMF or voice interaction.

In one embodiment, the web services system 108 is a server. Further, the web services system 108 may provide Application Programming Interfaces ("APIs") to access different services on the server. Accordingly, a set of data services APIs may be accessible through external API requests. These data services may utilize various data transport mechanisms and protocols. In one embodiment, the API calls can be made synchronously or asynchronously to the voice call.

Among other things, the API calls can provide the following services: identification of the caller and his or her account, identification of the language requested, ability to create a new account, ability to initiate an interpretation call, ability to query the system to determine the current language, availability prior to initiating a call, ability to provide a secure handshake and acknowledgement that the voice call initiated will be accepted, and the ability request a voice call back.

In one embodiment, the identifier may be utilized in addition to other data to store the user data in the database 110. For example, a timestamp that the request was initiated and a password may additionally be utilized.

Further, in one embodiment, the data module 106 receives the acknowledgement and informs the Internet enabled communication device 102 that the telephone call may be initiated. The Internet enabled communication device 102 then informs the telephone module that the telephone call may be initiated. In another embodiment, the data module 106 informs the telephony module 112 that the telephone call may be initiated.

In one embodiment, a first network such as the Internet 120 may be utilized for the communication between the data module 106 and the web services system 108 whereas a second distinct network such as the PSTN 122 may be utilized for the communication between the telephony module 112 and the language interpretation platform 104 or other type of platform providing a different service. In an alternative embodiment, a single network may be utilized for both communications. For example, the Internet 120 may be utilized for both the first communication between the data module 106 and the web services platform 108 and the second communication between the telephony module 112 and the language interpretation platform 104 or other type of platform providing a different service. The PSTN 122 may alternatively be utilized for both communications.

For illustrative purposes, the Internet enabled communication device 102 is Internet enabled and sends data from the data module 106 to the web services system 108 through the Internet 120. However, a network enabled communication device may be utilized to connect to a services system through networks other than the Internet. For example, a local area network ("LAN"), a wide area network ("WAN"), wireless network, etc. may be utilized. Accordingly, any of the configurations described herein may be utilized with network enabled communication device that communicates through with a services system through a network other than the Internet.

In one embodiment, the user may utilize the Internet 120 enabled communication device 102 to download the data module 106 to the Internet enabled communication device 102. The data module 106 may be downloaded from an Internet store. For example, the manufacturer of the Internet enabled communication device 102 may provide an Internet store for various applications that may be downloaded to the Internet enabled communication device 102. Alternatively, the user may download the data module 106 directly from the provider of the service 118. For example, the user may download the data module 106 directly from the language interpretation platform 104 when seeking a language interpretation service. In yet another alternative, the Internet enabled communication device 102 comes with the data module 106 pre-installed.

In an alternative embodiment, the data module 106 may be independent of the platform utilized by the Internet enabled communication device 102. Accordingly, the data module 106 may be utilized with different types of Internet enabled communication devices 102 with different types of platforms. For example, the data module 106 may be downloaded to both an Internet enabled communication device 102 that has a limitation preventing simultaneous execution of the data module 106 and the telephony module 112 and an Internet enabled communication device that allows simultaneous execution of the data module 106 and the telephony module 112. As a result, each of the Internet enabled communication devices 102 connects to the service 118 in a uniform manner irrespective of the specific platforms of the Internet enabled communication devices 102.

In another embodiment, the data module 106 may be utilized by an Internet enabled communication device 102 that allows simultaneous execution of the data module 106 and the telephony module 112. Accordingly, the data module 106 may be utilized even if the Internet enabled communication device 102 does not have a restriction on having both the data module 106 and the telephony module 112 in the memory at the same time.

In one embodiment, the Internet enabled communication device 102 allows the user to input user data through visual interaction. For example, after the user has downloaded the data module 106, the user may visually interact with the Internet enabled communication device 102 to provide information to create an account. For instance, the user can be visually prompted for information such as name, password, credit card number, etc. The user may also be visually prompted about the specifics regarding the service 118. For example, the user may be visually prompted to enter the language for which the user needs an interpreter.

Figure 2A:
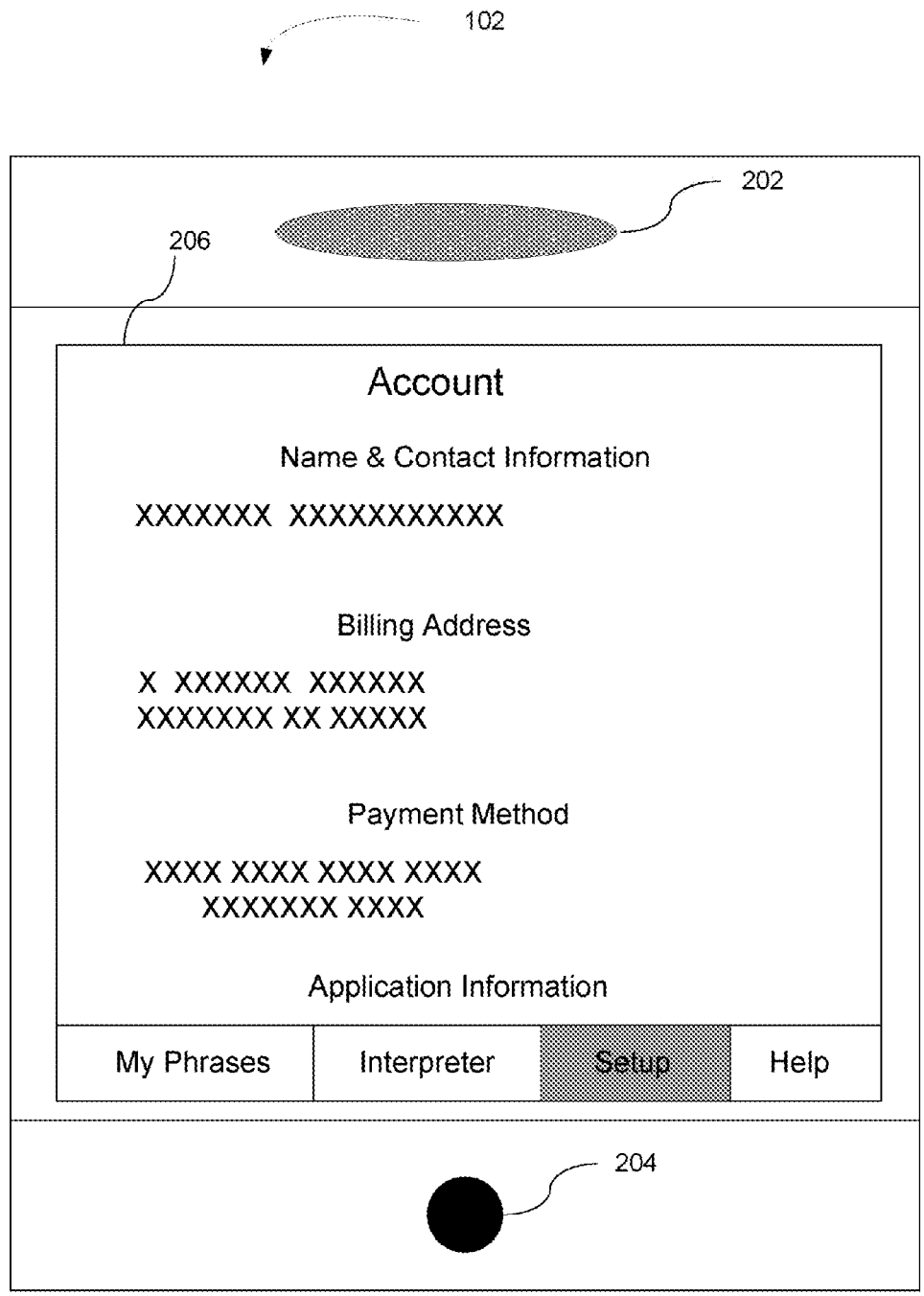
FIGS. 2A-2E illustrate external views of the Internet enabled communication device.

FIGS. 2A-2E illustrate external views of the Internet enabled communication device 102. FIG. 2A illustrates an external view of the Internet enabled communication device 102 when the user is creating an account. The Internet enabled communication device 102 has a speaker 102 for inputting and outputting the voice data. Further, the Internet enabled communication device 102 has a selector 204 that allows the user to make a selection to provide input. In addition, the Internet enabled communication device 102 has a display screen 206 that allows the user to visually interact with the Internet enabled communication device 102. The display screen 206 allows the user to navigate through the menus of an application such as the data module 106 and may prompt the user for information. For example, the display screen 206 may provide the following tabs: My Phrases, Interpreter, Setup, and Help. The current selection of Setup is highlighted. The user may create the account with this tab selection. For example, the user may provide data such as Name & Contact Information, Billing Address, and Payment Method.

Figure 2B:
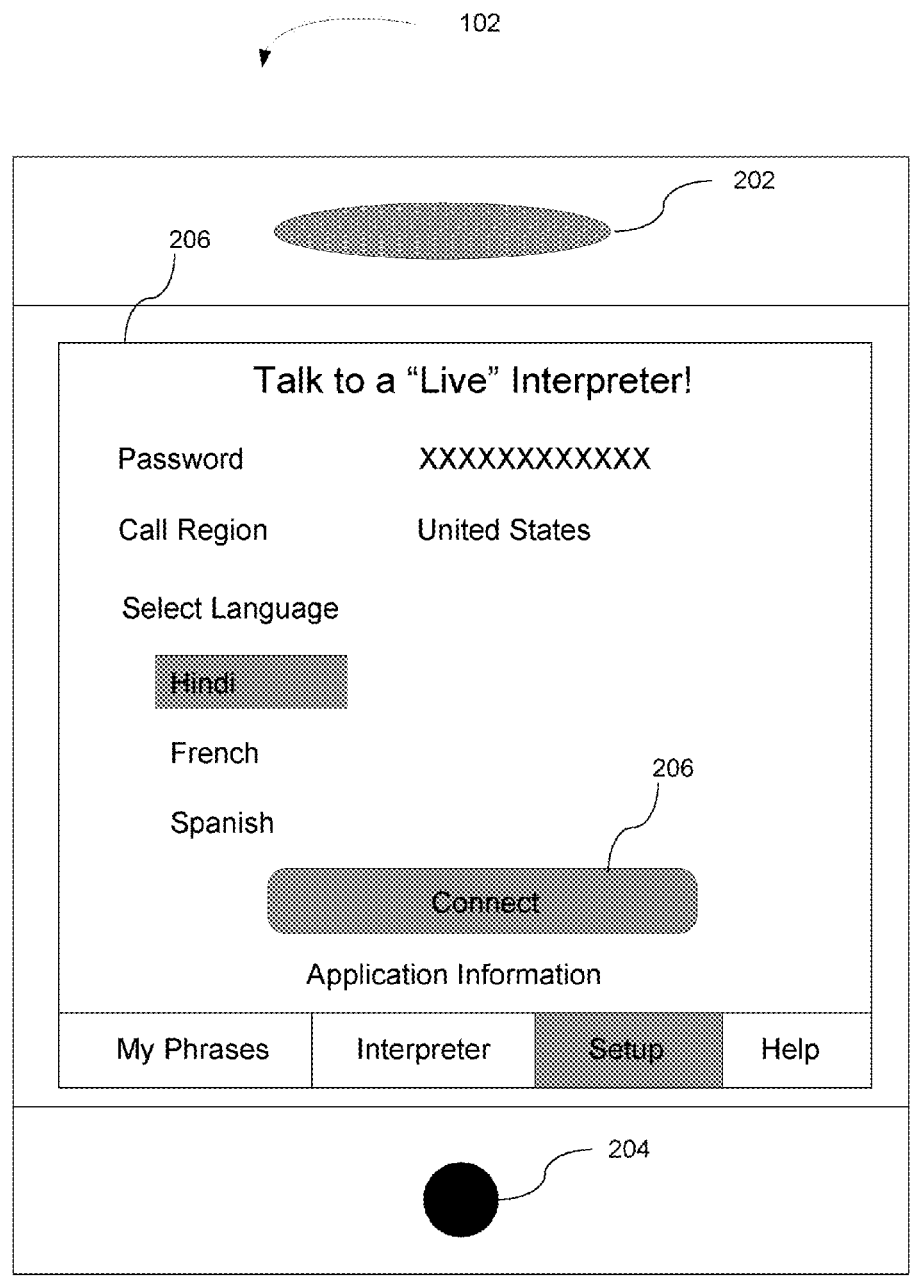

FIG. 2B illustrates an external view of the Internet enabled communication device 102 when the user is attempting to connect to an interpreter. The current selection of Interpreter is highlighted. The user can select a call region and a language for which the user is requesting interpretation. A connect selector 206 may be selected by the user to connect the user to a live interpreter that is qualified to perform language interpretation in the language that is selected.

Figure 2C:
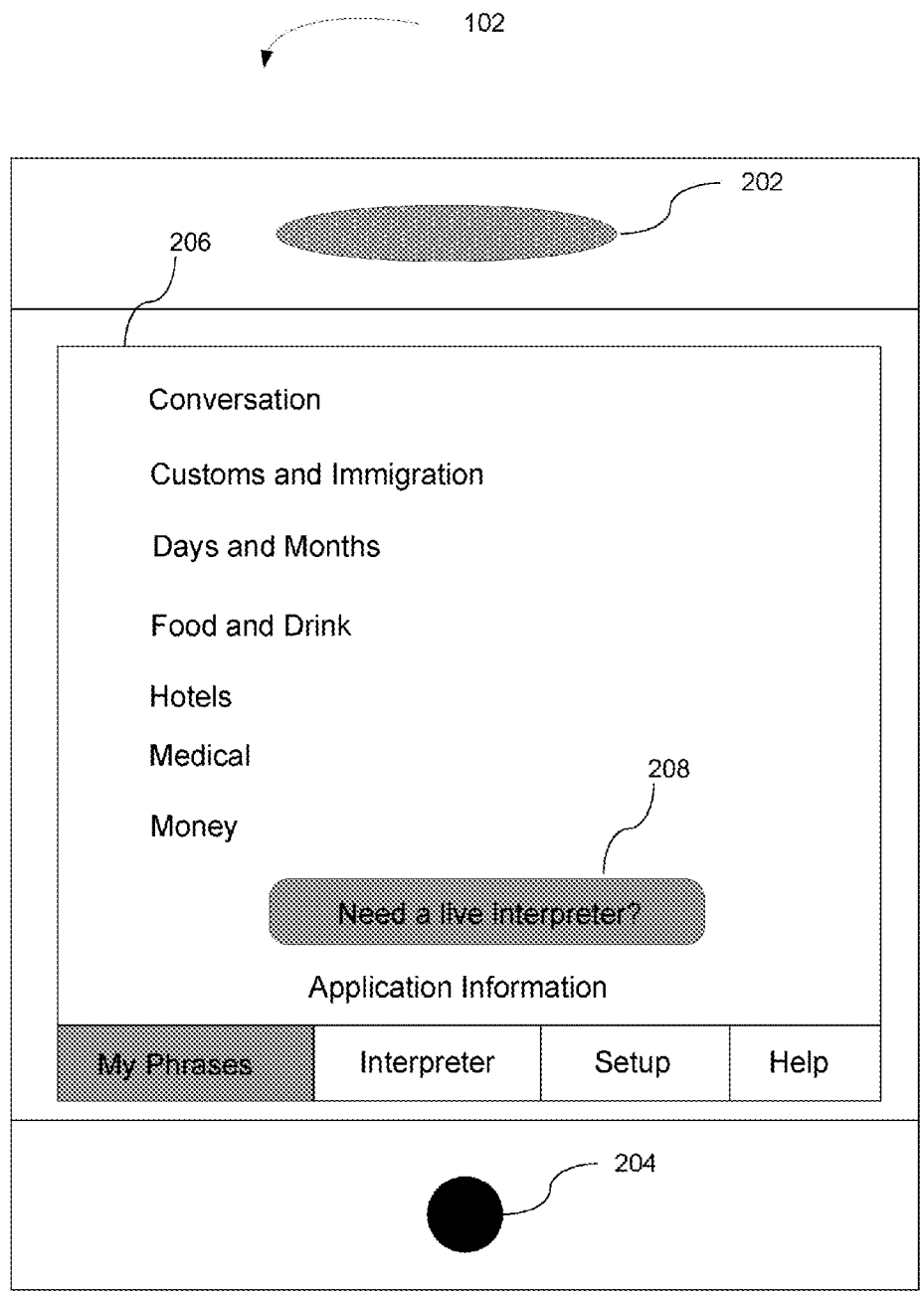

The user can also select the My Phrases tab, which provides the user with translations of many everyday spoken phrases in a particular language. In one embodiment, the phrase are categorizes into various categories. FIG. 2C illustrates a variety of different categories of phrases from which the user may make a selection. For example, the categories may include Conversation, Customs and Immigration, Days and Months, Food and Drink, Hotels, Medical, and Money. If the user does not see a category of phrases that will help with the user, then the user can select a live interpreter selector 208 to be connected to a live interpreter that can provide language interpretation assistance.

Figure 2D:
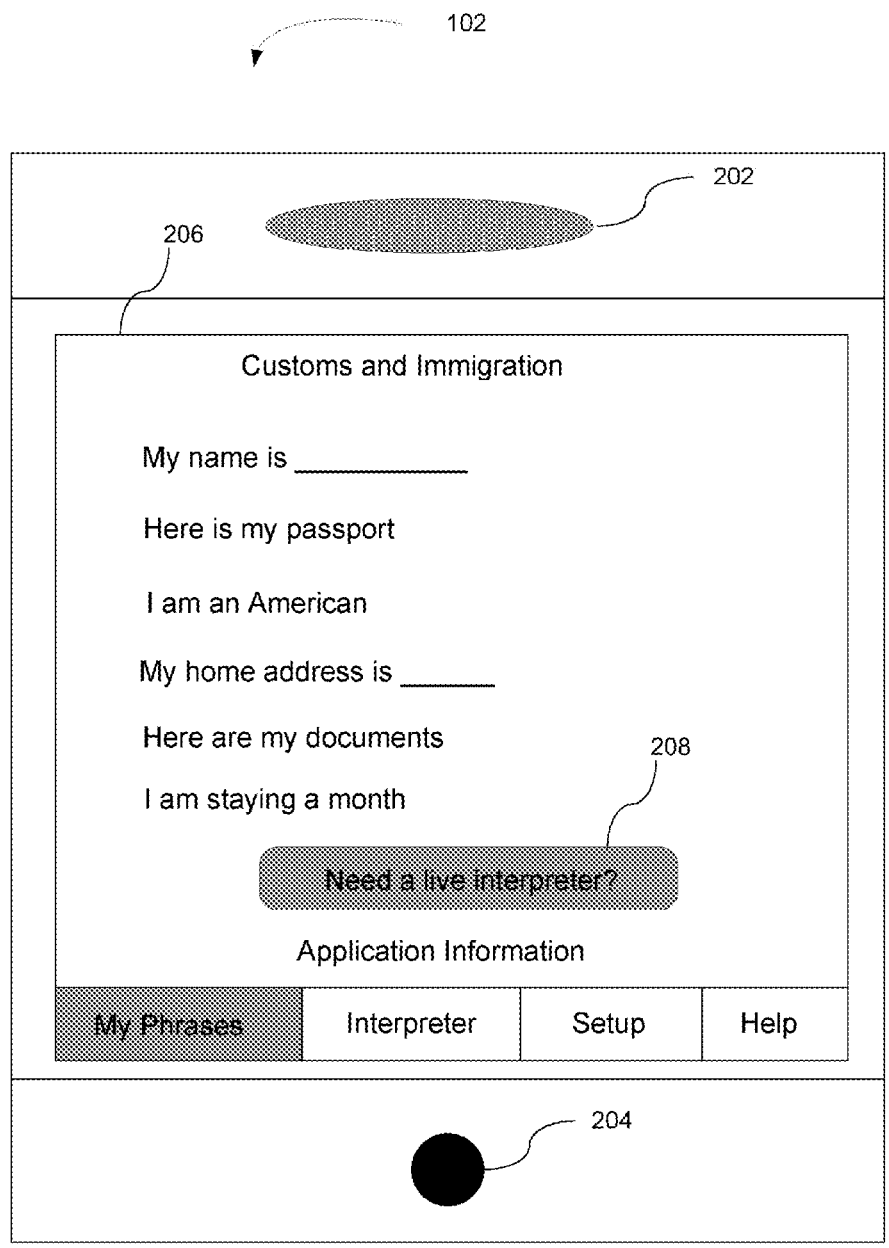

FIG. 2D illustrates various phrases after a user makes a selection of a phrase category. If the user does not see a phrase that will assist the user, then the user can select the live interpreter selector 208 to be connected to a live interpreter that can provide language interpretation assistance.

Figure 2E:
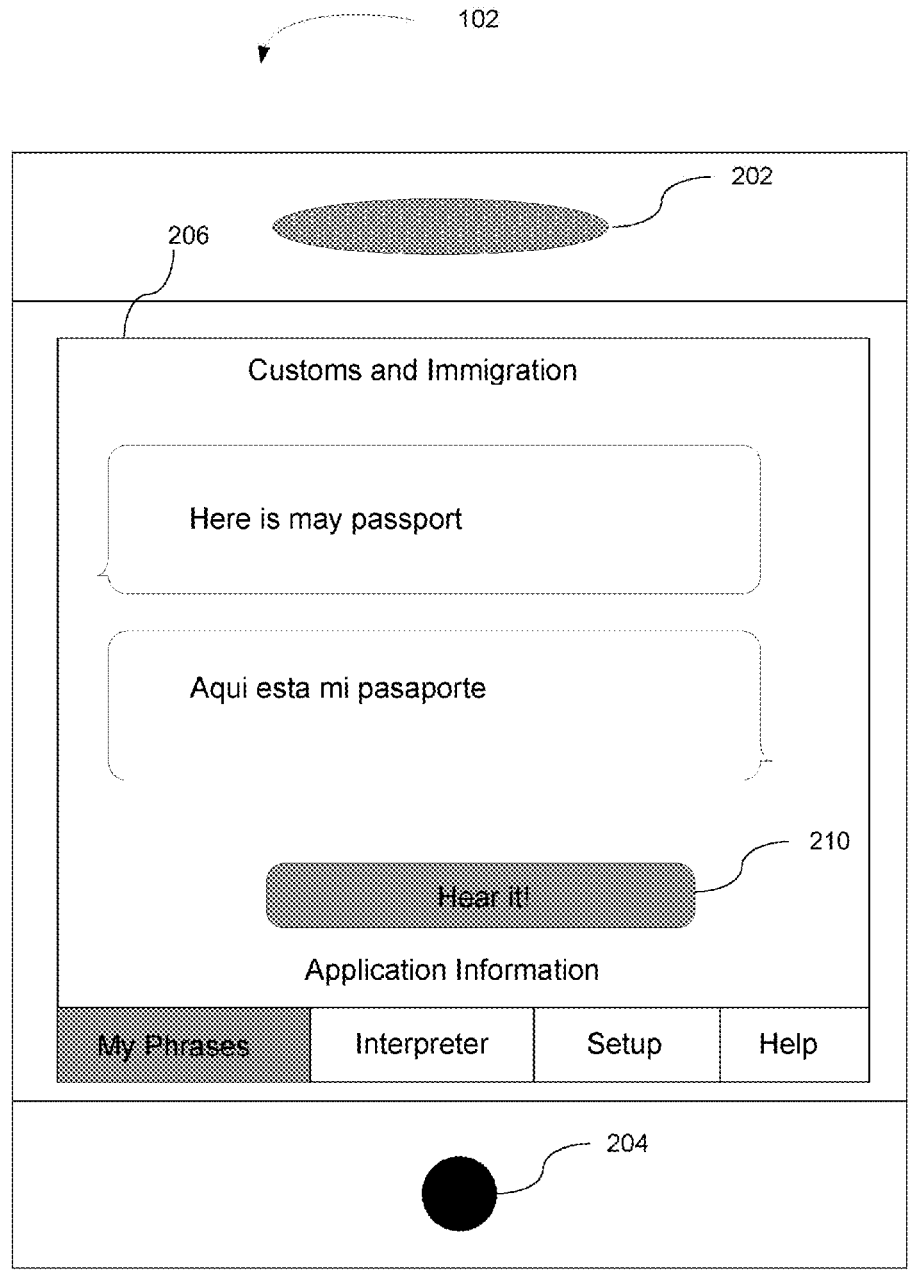

FIG. 2E illustrates a phrase that has been selected and the corresponding translation of that phrase. In one embodiment, the user may select an audio selector 210 so that the user may receive an audio phrase. The user may hear the phrase spoken in the language. The phrase may be downloaded from the web services system 108 through the Internet 120.

Further, the user can select the Help tab. If the user is having any difficulty with operating the data module 106, the user can select the Help tab to receive information.

Figure 3:
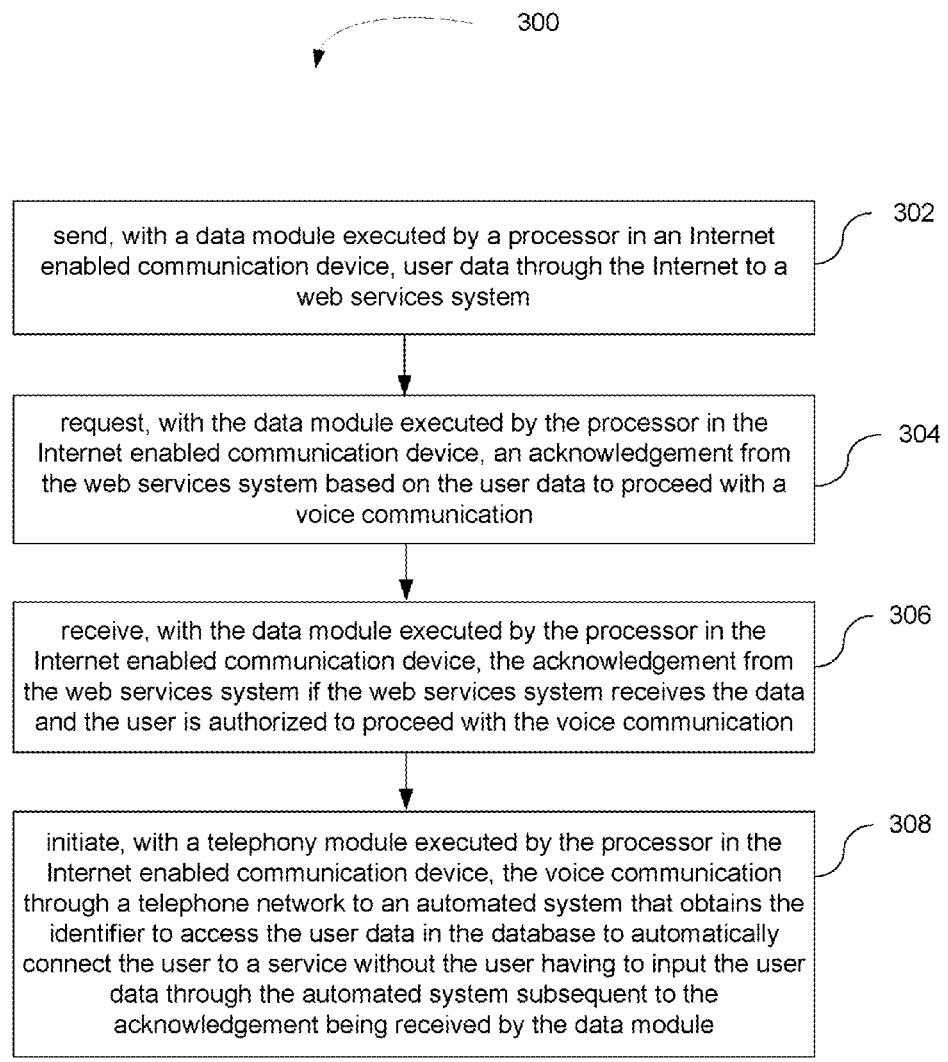
FIG. 3 illustrates a process that may be implemented by the Internet enabled communication device.

FIG. 3 illustrates a process 300 that may be implemented by the Internet enabled communication device 102. At process block 302, the process 300 sends, with the data module 106 executed by the processor 120 in the Internet enabled communication device 102, user data through the Internet to the web services system 108. The user data includes an identifier. The web services system 108 stores the data in the database 110 according to the identifier. Further, at a process block 304, the process 300 requests, with the data module 106 executed by the processor 120 in the Internet enabled communication device 102, an acknowledgement from the web services system 108 based on the user data to proceed with a voice communication. In addition, at a process block 306, the process 300 receives, with the data module 106 executed by the processor 120 in the Internet enabled communication device 102, the acknowledgement from the web services system 108 if the web services system receives the data and the user is authorized to proceed with the voice communication. At a process block 308, the process 300 also initiates, with the telephony module 112 executed by the processor 120 in the Internet enabled communication device 102, the voice communication through a telephone network to the automated system 116 that obtains the identifier to access the user data in the database 110 to automatically connect the user to the service 118 without the user having to input the user data through the automated system 116 subsequent to the acknowledgement being received by the data module 106.

Figure 4:
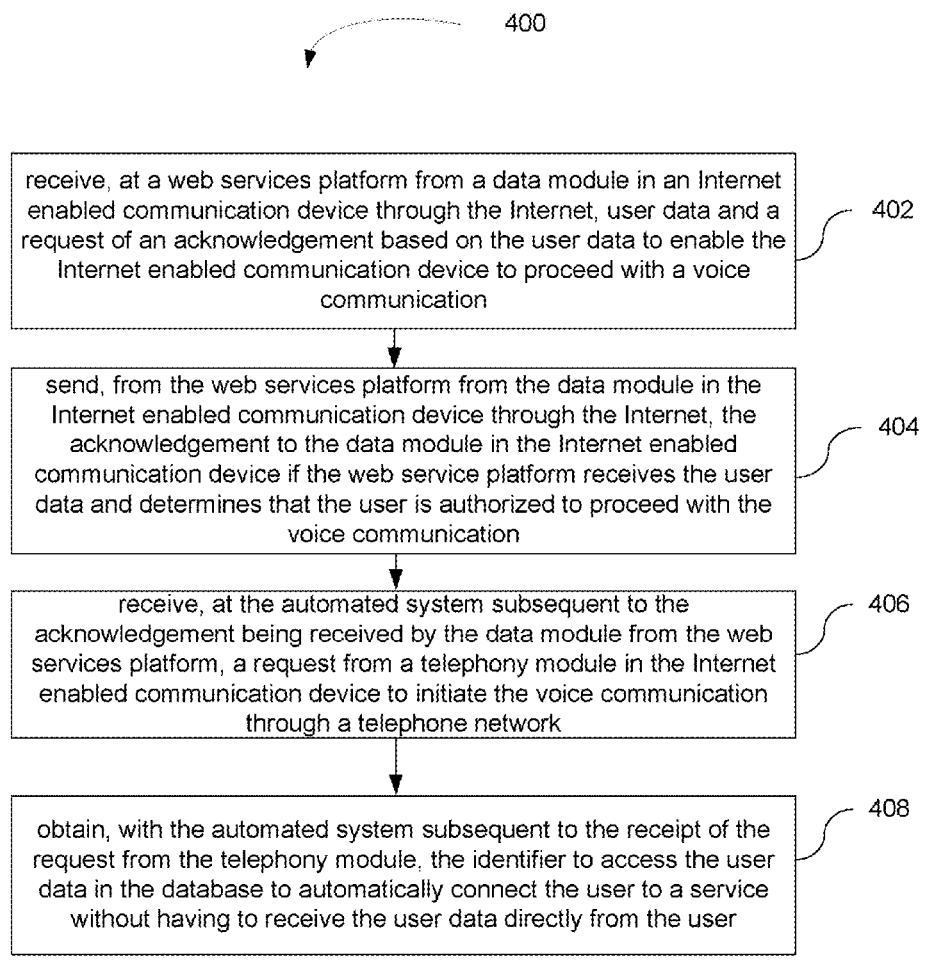
FIG. 4 illustrates a process that may be implemented by the language interpretation platform.

FIG. 4 illustrates a process 400 that may be implemented by the language interpretation platform 104. At a process block 402, the process 400 receives, at a web services system 108 from the data module 106 in the Internet enabled communication device 102 through the Internet, user data and a request of an acknowledgement based on the user data to enable the Internet enabled communication device 102 to proceed with a voice communication. The user data includes an identifier. The web services system 108 stores the data in a database 110 according to the identifier. Further, at a process block 404, the process 400 sends, from the web services system 108 from the data module 106 in the Internet enabled communication device through the Internet, the acknowledgement to the data module 106 in the Internet enabled communication device if the web service platform receives the user data and determines that the user is authorized to proceed with the voice communication. In addition, at a process block 406, the process 400 receives, with the automated system 116 subsequent to the acknowledgement being received by the data module 106 from the web services system 108, a request from the telephony module 112 in the Internet enabled communication device 102 to initiate the voice communication through a telephone network. At a process block 408, the process 400 obtains, with the automated system 116 subsequent to the receipt of the request from the telephony module 112, the identifier to access the user data in the database 110 to automatically connect the user to the service 118 without having to receive the user data directly from the user.

Figure 5:
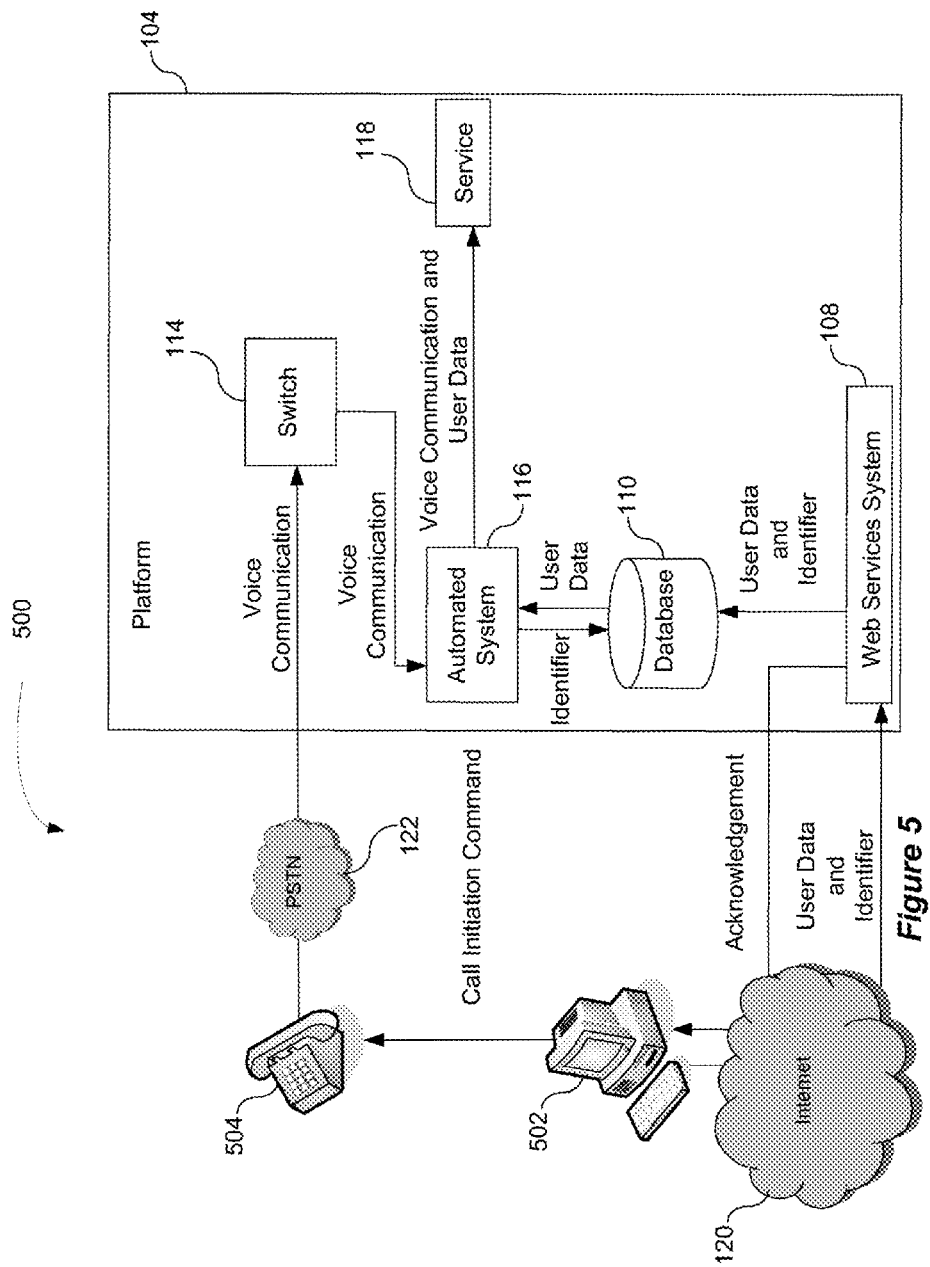
FIG. 5 illustrates a data communication system.

FIG. 5 illustrates a data communication system 500. The language interpretation system 100 may be implemented for services other than language interpretation. Further, the language interpretation system 100 is not limited to the Internet enabled communication device 102. For example, the functionality of the data module 106 and the telephony module 112 may be performed by separated devices such as a computer 502 and a telephone 504. The computer 502 provides a call initiation command to the telephone 504 after the acknowledgement has been received by the computer 502.

Any of the configurations provided herein may be utilized for communications other than voice communications. Accordingly, a data communication device may be utilized rather than a telephony module or a telephone. As an example, video communications may be utilized.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of storing those instructions and include a CD-ROM, DVD, magnetic or other optical disc, tape, silicon memory, e.g., removable, non-removable, volatile or non-volatile, etc.

A computer is herein intended to include any device that has a general, multi-purpose or single purpose processor as described above. For example, a computer may be a set top box, cell phone, smart phone, portable media player, mp3 player, video player, or the like.

Figure 6:
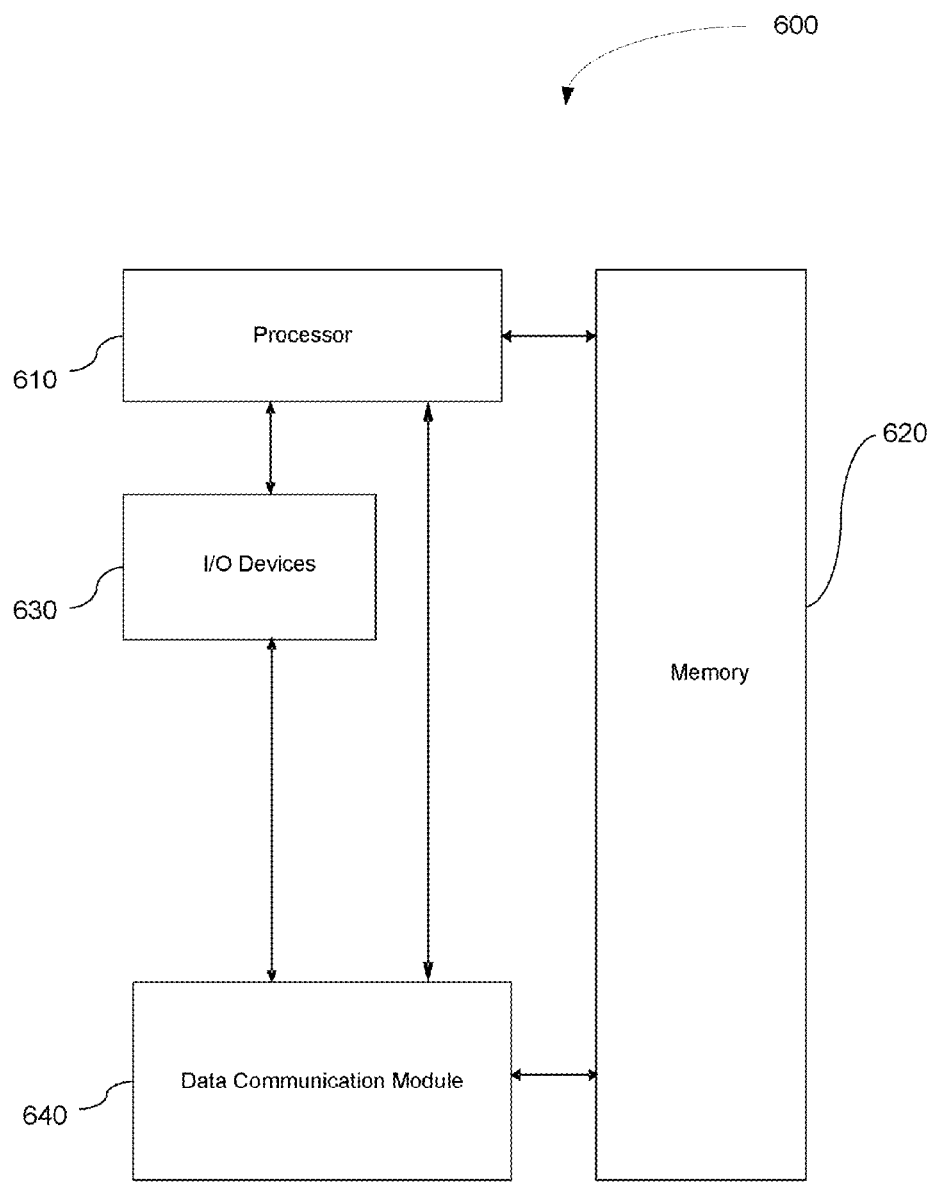
FIG. 6 illustrates a block diagram of a system that provides data communication.

FIG. 6 illustrates a block diagram of a system 600 that provides data communication. In one embodiment, the system 600 is implemented utilizing a general purpose computer or any other hardware equivalents. Thus, the system 600 comprises a processor 610, a memory 620, e.g., random access memory ("RAM") and/or read only memory (ROM), a data communication module 640, and various input/output devices 640, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the data communication module 640 may be implemented as one or more physical devices that are coupled to the processor 610. Alternatively, the data communication module 640 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor in the memory 620 of the computer. As such, the data communication module 640 (including associated data structures) of the present disclosure may be stored on a computer readable medium, e.g., RAM memory, magnetic or optical drive or diskette and the like. The system 600 may be utilized for a hardware implementation of any of the configurations provided herein.

It is understood that the apparatuses, systems, and processes described herein may also be applied in other types of apparatuses, systems, and processes. Those skilled in the art will appreciate that the various adaptations and modifications of the embodiments of the apparatuses, systems, and processes described herein may be configured without departing from the scope and spirit of the present apparatuses, systems, and processes. Therefore, it is to be understood that, within the scope of the appended claims, the present apparatuses, systems, and processes may be practiced other than as specifically described herein.

We claim:

1. An Internet enabled communication device comprising:
a data module that sends user data through the Internet to a web services system, requests an acknowledgement from the web services system based on the user data to proceed with a voice communication, and receives the acknowledgement from the web services system if the web services system receives the data and the user is authorized to proceed with the voice communication, the user data including an identifier, the web services system storing the user data in a database according to the identifier; and
a telephony module that, subsequent to the data module receiving the acknowledgement from the web services system, initiates the voice communication through a telephone network to an automated system that obtains the identifier to access the user data in the database to automatically connect the user to a service without the user having to input the user data through the automated system.

2. The Internet enabled communication device of claim 1, wherein the user data includes a name of the user.

3. The Internet enabled communication device of claim 1, wherein the user data includes account information of the user.

4. The Internet enabled communication device of claim 1, wherein the user data includes the service requested by the user.

5. The Internet enabled communication device of claim 4, wherein the service requested by the user is language interpretation for a specific language.

6. The Internet enabled communication device of claim 4, wherein the service requested by the user is live language interpretation by an interpreter for a specific language.

7. The Internet enabled communication device of claim 1, wherein the identifier is a telephone number.

8. The Internet enabled communication device of claim 1, wherein the automated system obtains the identifier through caller identification.

9. The Internet enabled communication device of claim 1, wherein the telephone network is distinct from the Internet.

10. The Internet enabled communication device of claim 1, wherein the web services system determines that the user is authorized to proceed with the voice communication if the web services system receives an indication from a credit card processor that a credit card of a user is valid and a predetermined amount of available credit is available on the credit card of the user.

11. The Internet enabled communication device of claim 1, further comprising a display screen through which the user inputs the user data prior to the data module sending the user data to the web services system.

12. The Internet enabled communication device of claim 1, wherein the telephony module and the data module are prevented from being utilized simultaneously.

13. A system comprising:
a database;
a web services device that (i) receives, from a data module in an Internet enabled communication device, through the Internet user data and a request of an acknowledgement based on the user data to enable the Internet enabled communication device to proceed with a voice communication and (ii) sends the acknowledgement to the data module in the Internet enable device if the web service platform receives the user data and determines that the user is authorized to proceed with the voice communication, the user data including an identifier, the web services system storing the data in the database according to the identifier; and
an automated system that, subsequent to the web services system sending the acknowledgement to the data module, (i) receives a request from a telephony module in the Internet enabled communication device to initiate the voice communication through a telephone network and (ii) obtains the identifier to access the user data in the database to automatically connect the user to a service without having to receive the user data directly from the user.

14. The system of claim 13, wherein the Internet enabled communication device prevents the data module from directly communicating with the telephony module within the Internet enabled communication device.

15. The system of claim 13, wherein the Internet enabled communication device prevents the telephony module and the data module from being utilized simultaneously.

16. The system of claim 13, wherein the Internet enabled communication device is a telephone.

17. The system of claim 13, wherein the user data includes a name of the user.

18. The system of claim 13, wherein the user data includes account information of the user.

19. The system of claim 13, wherein the user data includes the service requested by the user.

20. The system of claim 19, wherein the service requested by the user is language interpretation for a specific language.

21. The system of claim 19, wherein the service requested by the user is live language interpretation by an interpreter for a specific language.

22. The system of claim 13, wherein the identifier is a telephone number.

23. The system of claim 13, wherein the automated system obtains the identifier through caller identification.

24. The system of claim 13, wherein the telephone network is distinct from the Internet.

25. The system of claim 13, wherein the web services system determines that the user is authorized to proceed with the voice communication if the web services system receives an indication from a credit card processor that a credit card of a user is valid and a predetermined amount of available credit is available on the credit card of the user.

26. The system of claim 13, wherein the Internet enabled communication device includes a display screen through which the user inputs the user data prior to the data module sending the user data to the web services system.

27. A method comprising:
sending, with a data module executed by a processor in an Internet enabled communication device, user data through the Internet to a web services system, the user data including an identifier, the web services system storing the data in a database according to the identifier;

requesting, with the data module executed by the processor in the Internet enabled communication device, an acknowledgement from the web services system based on the user data to proceed with a voice communication;

receiving, with the data module executed by the processor in the Internet enabled communication device, the acknowledgement from the web services system if the web services system receives the data and the user is authorized to proceed with the voice communication; and initiating, with a telephony module executed by the processor in the Internet enabled communication device, the voice communication through a telephone network to an automated system that obtains the identifier to access the user data in the database to automatically connect the user to a service without the user having to input the user data through the automated system subsequent to the acknowledgement being received by the data module.

28. The method of claim 27, wherein the user data includes a name of the user.

29. The method of claim 27, wherein the user data includes account information of the user.

30. The method of claim 27, wherein the user data includes the service requested by the user.

31. The method of claim 30, wherein the service requested by the user is language interpretation for a specific language.

32. The method of claim 31, wherein the service requested by the user is live language interpretation by an interpreter for a specific language.

33. The method of claim 27, wherein the identifier is a telephone number.

34. The method of claim 27, wherein the automated system obtains the identifier through caller identification.

35. The method of claim 27, wherein the telephone network is distinct from the Internet.

36. The method of claim 27, wherein the web services system determines that the user is authorized to proceed with the voice communication if the web services system receives an indication from a credit card processor that a credit card of a user is valid and a predetermined amount of available credit is available on the credit card of the user.

37. The method of claim 27, further comprising providing a display screen through which the user inputs the user data prior to the data module sending the user data to the web services system.

38. The method of claim 27, wherein the telephony module and the data module are prevented from being utilized simultaneously.

39. A method comprising:

receiving, at a web services system from a data module in an Internet enabled communication device through the Internet, user data and a request of an acknowledgement based on the user data to enable the Internet enabled communication device to proceed with a voice communication, the user data including an identifier, the web services system storing the data in a database according to the identifier;

sending, from the web services system to the data module in the Internet enabled communication device through the Internet, the acknowledgement to the data module in the Internet enabled communication device if the web service platform receives the user data and determines that the user is authorized to proceed with the voice communication;

receiving, at the automated system subsequent to the acknowledgement being received by the data module from the web services system, a request from a telephony module in the Internet enabled communication device to initiate the voice communication through a telephone network; and obtaining, with the automated system subsequent to the receipt of the request from the telephony module, the identifier to access the user data in the database to automatically connect the user to a service without having to receive the user data directly from the user.

40. The method of claim 39, wherein the Internet enabled communication device prevents the data module from directly communicating with the telephony module within the Internet enabled communication device.

41. The method of claim 39, wherein the Internet enabled communication device prevents the telephony module and the data module from being utilized simultaneously.

42. The method of claim 39, wherein the Internet enabled communication device is a telephone.

43. The method of claim 39, wherein the user data includes a name of the user.

44. The method of claim 39, wherein the user data includes account information of the user.

45. The method of claim 39, wherein the user data includes the service requested by the user.

46. The method of claim 45, wherein the service requested by the user is language interpretation for a specific language.

47. The method of claim 45, wherein the service requested by the user is live language interpretation by an interpreter for a specific language.

48. The method of claim 39, wherein the identifier is a telephone number.

49. The method of claim 39, wherein the automated system obtains the identifier through caller identification.

50. The method of claim 39, wherein the telephone network is distinct from the Internet.

51. The method of claim 39, wherein the web services system determines that the user is authorized to proceed with the voice communication if the web services system receives an indication from a credit card processor that a credit card of a user is valid and a predetermined amount of available credit is available on the credit card of the user.

52. The method of claim 39, wherein the Internet enabled communication device includes a display screen through which the user inputs the user data prior to the data module sending the user data to the web services system.

53. A computer program product comprising a computer useable storage device having a computer readable program, wherein the computer readable program when executed on a computer causes the computer to:

send, with a data module executed by a processor in an Internet enabled communication device, user data through the Internet to a web services system, the user data including an identifier, the web services system storing the data in a database according to the identifier;

request, with the data module executed by the processor in the Internet enabled communication device, an acknowledgement from the web services system based on the user data to proceed with a voice communication;

receive, with the data module executed by the processor in the Internet enabled communication device, the acknowledgement from the web services system if the web services system receives the data and the user is authorized to proceed with the voice communication; and initiate, with a telephony module executed by the processor in the Internet enabled communication device, the voice communication through a telephone network to an automated system that obtains the identifier to access the user data in the database to automatically connect the user to a service without the user having to input the user data through the automated system subsequent to the acknowledgement being received by the data module.

54. A computer program product comprising a computer useable storage device having a computer readable program, wherein the computer readable program when executed on a computer causes the computer to:
receive, with a web services system from a data module in an Internet enabled communication device through the Internet, user data and a request of an acknowledgement based on the user data to enable the Internet enabled communication device to proceed with a voice communication, the user data including an identifier, the web services system storing the data in a database according to the identifier;
send, with the web services system from the data module in the Internet enabled communication device through the Internet, the acknowledgement to the data module in the Internet enabled communication device if the web service platform receives the user data and determines that the user is authorized to proceed with the voice communication;
receive, with the automated system subsequent to the acknowledgement being received by the data module from the web services system, a request from a telephony module in the Internet enabled communication device to initiate the voice communication through a telephone network; and
obtain, with the automated system subsequent to the receipt of the request from the telephony module, the identifier to access the user data in the database to automatically connect the user to a service without having to receive the user data directly from the user.

55. A system comprising:
a computing device that sends user data through a first network to a services system, requests an acknowledgement from the services system based on the user data to proceed with a voice communication, and receives the acknowledgement from the services system if the services system receives the data and the user is authorized to proceed with the voice communication, the user data including an identifier, the services system storing the data in a database according to the identifier; and
a telephone, subsequent to the computing device receiving the acknowledgement from the services system, initiates the voice communication through a second network to an automated system that obtains the identifier to access the user data in the database to automatically connect the user to a service without the user having to input the user data through the automated system, the second network being distinct from the first network.

56. A system comprising:
a database;
a services device that (i) receives, from a computing device, through a first network user data and a request of an acknowledgement based on the user data to enable the computing device to proceed with a voice communication and (ii) sends the acknowledgement to the computing device if the services device receives the user data and determines that the user is authorized to proceed with the voice communication, the user data including an identifier, the services device storing the data in the database according to the identifier; and
an automated system that, subsequent to the services device sending the acknowledgement to the computing device, (i) receives a request from a telephone to initiate the voice communication through a second network and (ii) obtains the identifier to access the user data in the database to automatically connect the user to a service without having to receive the user data directly from the user, the second network being distinct from the first network.

57. A system comprising:
a computing device that sends user data through a first network to a services system, requests an acknowledgement from the services system based on the user data to proceed with a communication, and receives the acknowledgement from the services system if the services system receives the data and the user is authorized to proceed with the communication, the user data including an identifier, the services system storing the data in a database according to the identifier; and
a communications device, subsequent to the computing device receiving the acknowledgement from the services system, initiates the communication through a second network to an automated system that obtains the identifier to access the user data in the database to automatically connect the user to a service without the user having to input the user data through the automated system.

58. A system comprising:
a database;
a services device that (i) receives, from a computing device, through a first network user data and a request of an acknowledgement based on the user data to enable the computing device to proceed with a communication and (ii) sends the acknowledgement to the computing device if the services device receives the user data and determines that the user is authorized to proceed with the communication, the user data including an identifier, the services device storing the data in the database according to the identifier; and
an automated system that, subsequent to the services device sending the acknowledgement to the computing device, (i) receives a request from a telephone to initiate the communication through a second network and (ii) obtains the identifier to access the user data in the database to automatically connect the user to a service without having to receive the user data directly from the user, the second network being distinct from the first network.

* * * * *